No. 863,147.
PATENTED AUG. 13, 1907.
D. F. BRODERICK.
AUTOMATIC JAPANNING APPARATUS.
APPLICATION FILED AUG. 11, 1906.
5 SHEETS—SHEET 1.
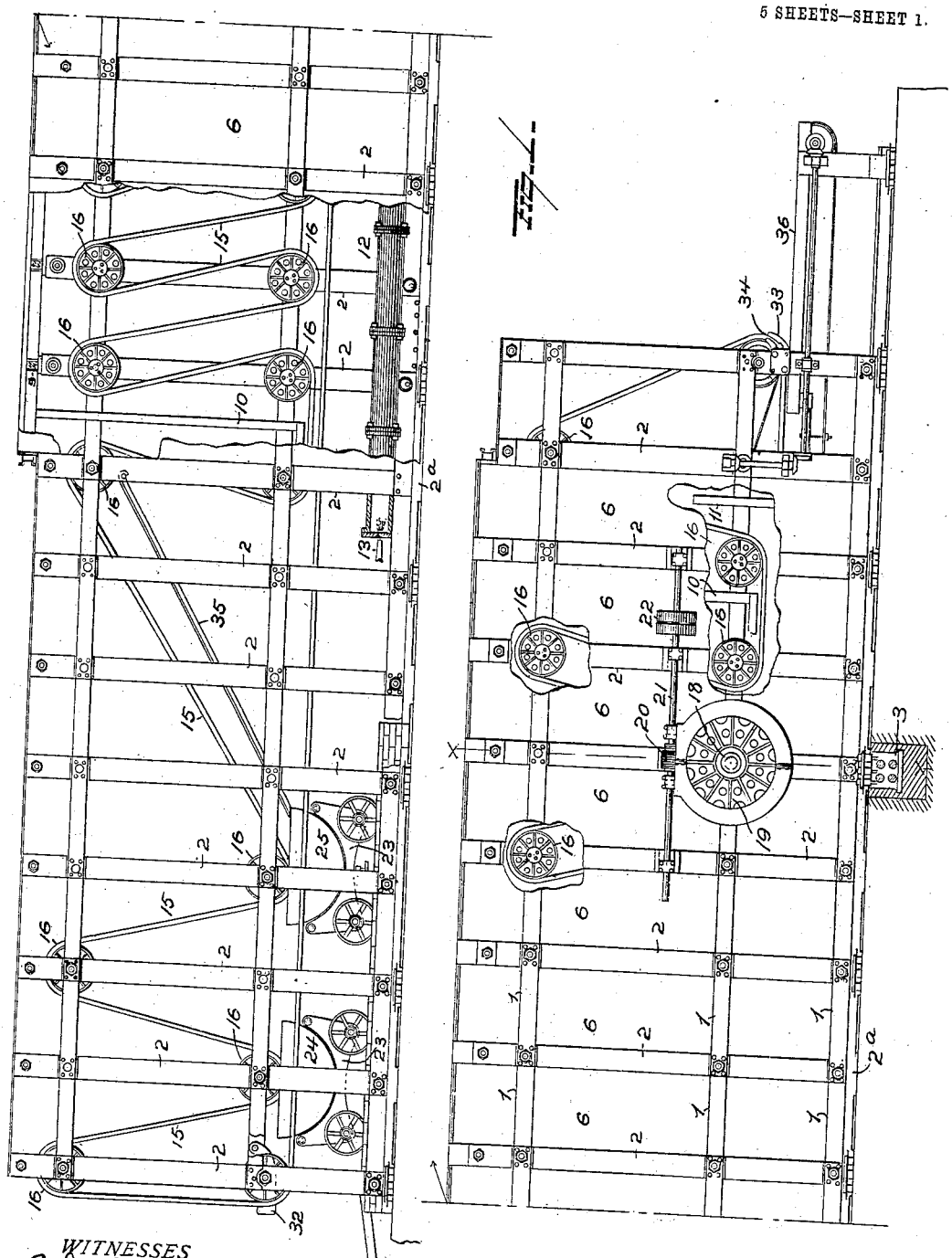
WITNESSES
INVENTOR
D. F. Broderick
By H. A. Seymour
Attorney No. 863,147. PATENTED AUG. 13, 1907.
D. F. BRODERICK.
AUTOMATIC JAPANNING APPARATUS.
APPLICATION FILED AUG. 11, 1906.
5 SHEETS—SHEET 2.
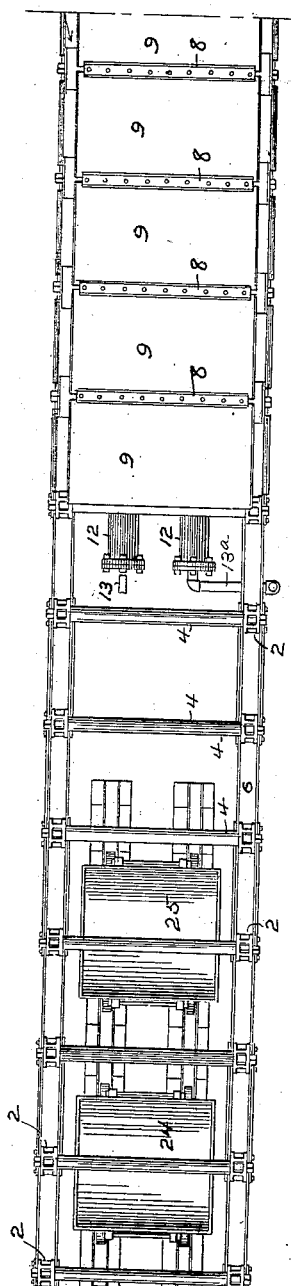
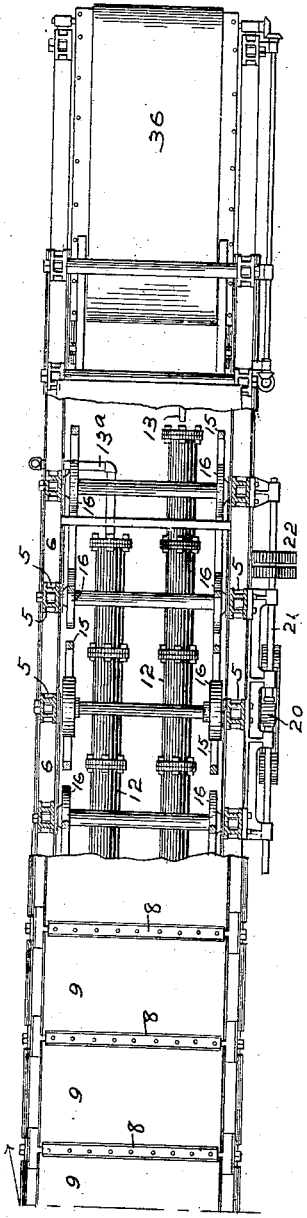
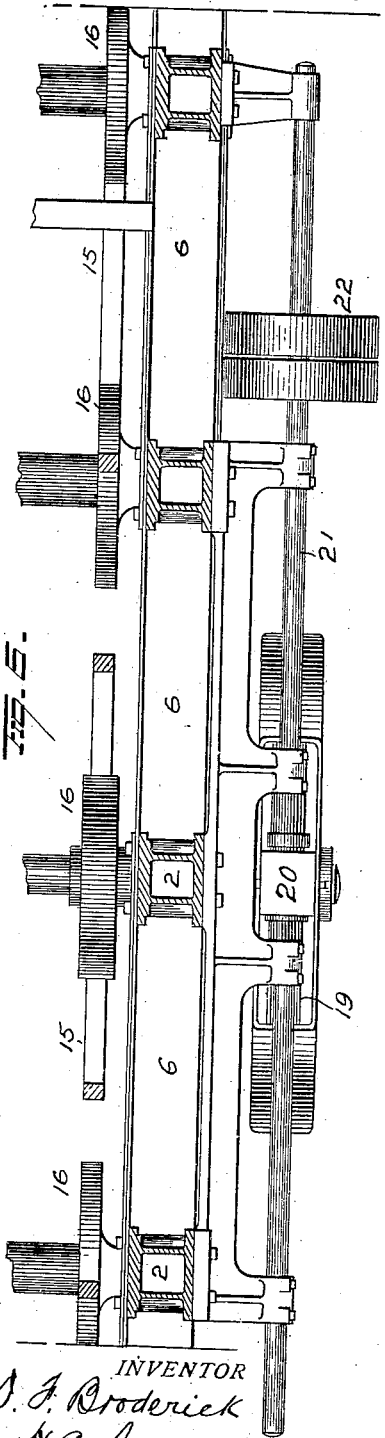
WITNESSES
INVENTOR
D. F. Broderick
By H. A. Seymour
Attorney No. 863,147. PATENTED AUG. 13, 1907.
D. F. BRODERICK.
AUTOMATIC JAPANNING APPARATUS.
APPLICATION FILED AUG. 11, 1906.
5 SHEETS—SHEET 3.
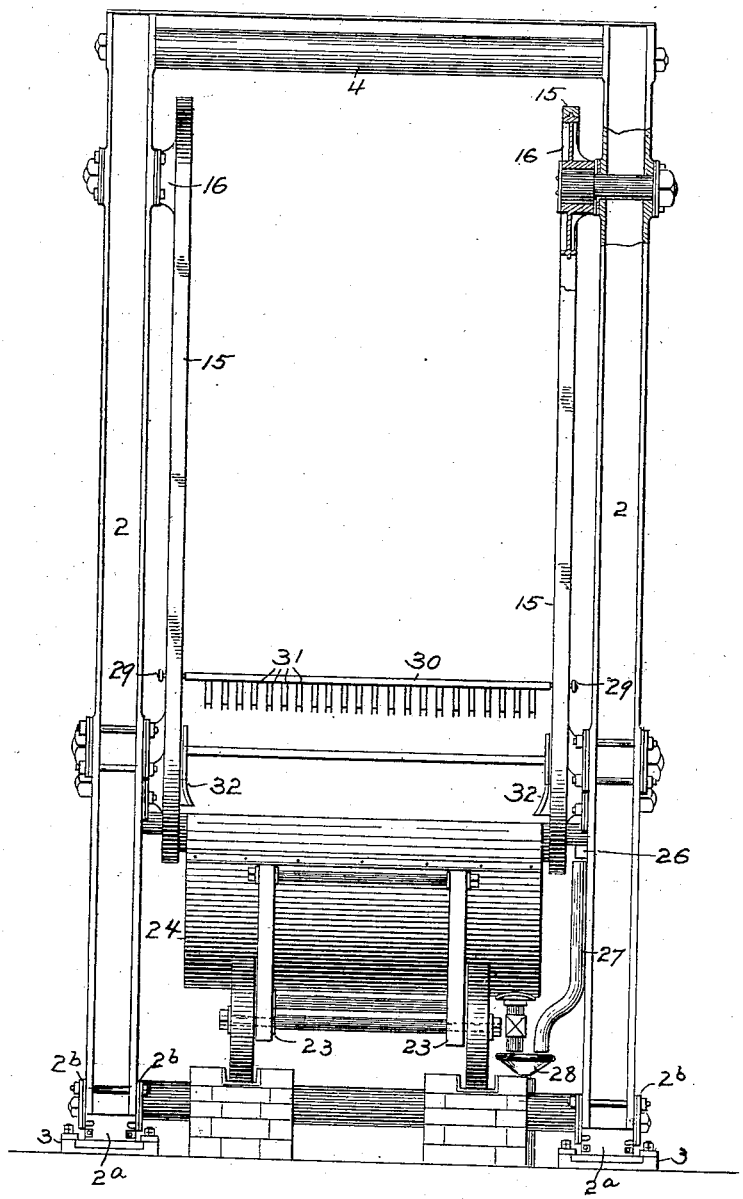
WITNESSES
INVENTOR
*Attorney*

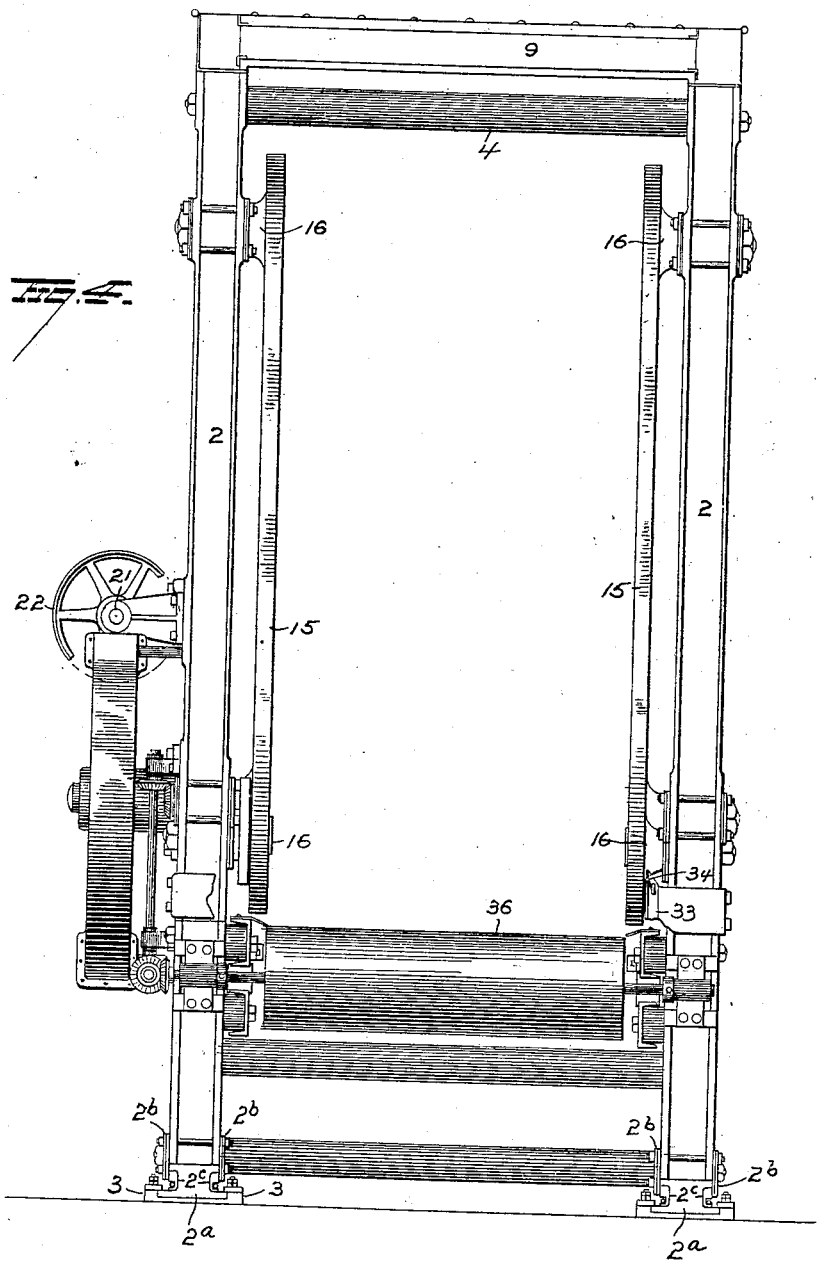

No. 863,147. PATENTED AUG. 13, 1907.
D. F. BRODERICK.
AUTOMATIC JAPANNING APPARATUS.
APPLICATION FILED AUG. 11, 1906.
5 SHEETS—SHEET 5.
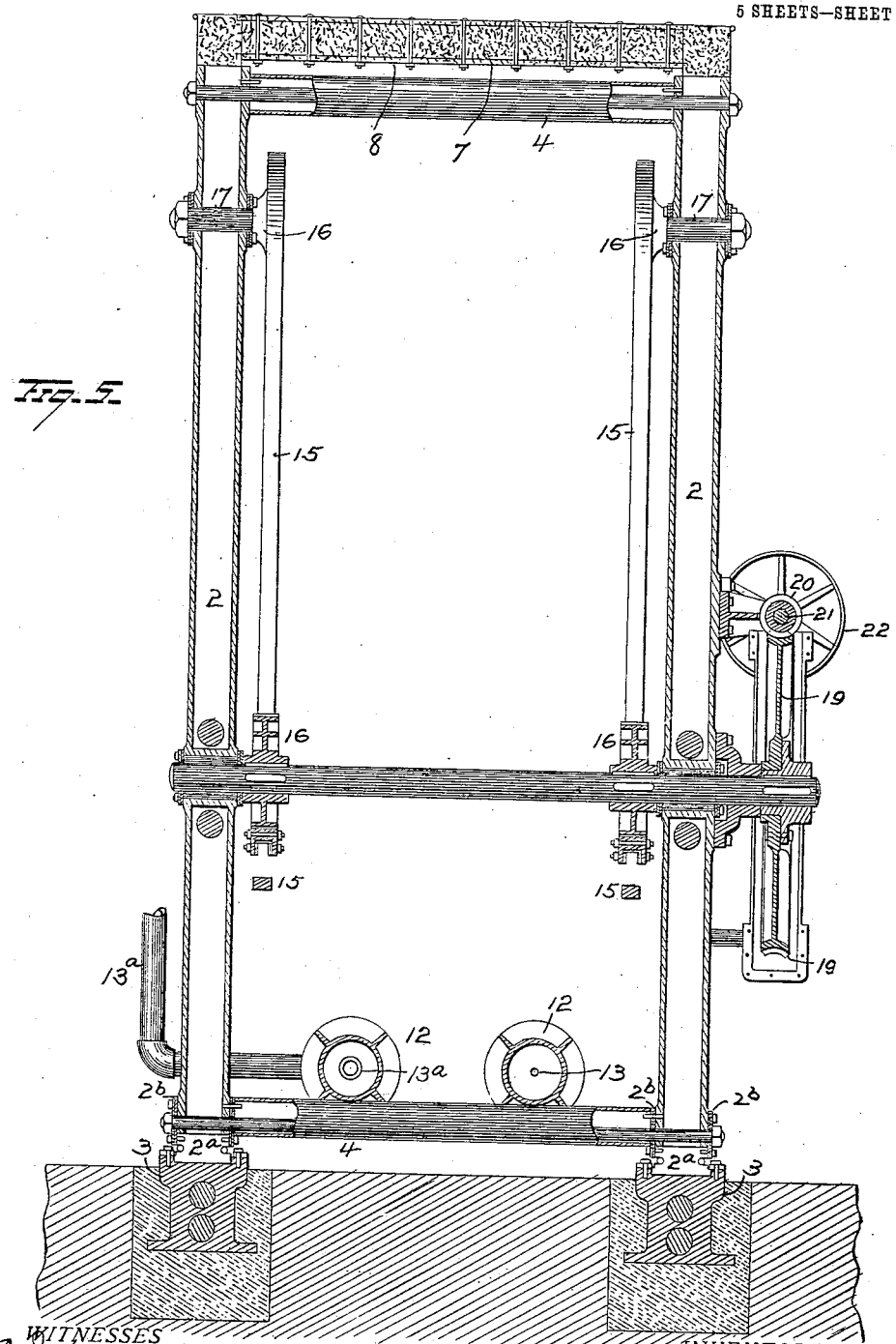

UNITED STATES PATENT OFFICE.

DAVID FELIX BRODERICK, OF NEW BRITAIN, CONNECTICUT, ASSIGNOR OF ONE-HALF TO LEWIS SPERRY, OF SOUTH WINDSOR, CONNECTICUT.

AUTOMATIC JAPANNING APPARATUS.

No. 863,147. Specification of Letters Patent. Patented Aug. 13, 1907.

Application filed August 11, 1906. Serial No. 330,238.

*To all whom it may concern:*

Be it known that I, DAVID FELIX BRODERICK, a resident of New Britain, in the county of Hartford and State of Connecticut, have invented certain new and useful Improvements in Automatic Japanning Apparatus; and I do hereby declare the following to be a full, clear, and exact description of the invention, such as will enable others skilled in the art to which it appertains to make and use the same.

My invention relates to an improved automatic japanning apparatus, the primary object of the invention being to construct the apparatus of an indefinite number of metal units, rigidly secured together and so support the framework as to permit the free expansion and contraction thereof.

A further object is to provide an improved framework which may be enlarged or contracted by the insertion or removal of frame units.

A further object is to provide improved means for automatically grasping article holders, conveying them through the apparatus and then automatically dropping them.

A further object is to provide an improved structure for heating the oven which insures an even distribution of heat throughout the same.

A further object is to provide an improved construction of oven and improved heat traps at the ends thereof to permit the conveyer to pass without undue loss of heat.

A further object is to provide improved mechanism for carrying articles through a cleansing bath, then dipping the articles in japanning liquid, then thoroughly drying the articles in an improved oven, and then depositing the japanned articles on a suitable conveyer, the entire operation being continuous and automatic.

With these and other objects in view, the invention consists in certain novel features of construction and combinations and arrangements of parts as will be more fully hereinafter described and pointed out in the claims.

In the accompanying drawings, Figure 1 is a view in side elevation partly broken away, illustrating my improvements. Fig. 2 is a top plan view partly broken away. Figs. 3 and 4 are views in elevation of the opposite ends of the apparatus. Fig. 5 is a view in section on the line $x-x$ of Fig. 1, and Fig. 6 is an enlarged view in longitudinal section through the oven wall.

The structural framework of the apparatus is made up of any desired number of approximately three foot units, connected by tie bars 1. Each unit comprises two pair of parallel standards 2, supported on parallel rails $2^a$ secured on suitably anchored foundations 3, and these pairs of standards 2 are connected by cross rods 4, and at their sides by tie bars 1, and by joining these units by the tie bars 1, a framework of any desired length is secured.

The rails $2^a$ above referred to, are made with longitudinal grooves in their opposite sides, and plates $2^b$ secured to the opposite sides of standards 2, are provided with lugs $2^c$ projecting into the grooves of the rails $2^a$ to securely lock the standards to the rails, but permit them to move on the rails to compensate for contraction and expansion of the metal, due to change of temperatures in the oven. The inlet end of this frame work, which is known as the "loading section" is open, but the "oven section" which comprises the greater portion of the framework, is inclosed, as will now be explained.

The standards 2, at opposite sides, are made with longitudinal grooves, receiving longitudinal tenons 5 on vertical slides 6, closing the spaces between the standards. These slides 6 are hollow and constitute dead air chambers to retain the maximum temperature in the oven, and a packing of asbestos, or other suitable material 7, is disposed between the tenons 5 and standards 2, to prevent any escape of heat at this juncture. The upper ends of standards 2 are connected by grooved cross bars 8, to receive horizontal slides 9 between them. These slides 9 are similar to slides 6 and constitute the closed top of the oven. The ends of the oven are closed by pairs of partitions 10 and 11, the former depending from the top of the oven and the latter projecting up from the bottom thereof, with a space between them for the passage of the conveyer, and these partitions 10 and 11, serve as traps to admit the articles on the conveyer and permit their exit, without material loss of heat from the oven.

To heat the oven, parallel radiating pipes 12 are located in the bottom thereof, and extend substantially throughout the length of the oven, and have liquid fuel burners 13 directing their flame into one end of the pipes, the waste products of combustion being exhausted from the opposite ends of the pipes 12, by pipes $13^a$. To better distribute the heat throughout the oven, one of these burners 13 directs its flame into its pipe 12 at the inlet end of the oven, and the other burner 13, directs its flame into the other pipe 12 at the outlet end of the oven, thus while the hotter end of one pipe is at the inlet end of the oven, the hotter end of the other pipe is at the outlet end of the oven and the temperature of the oven is approximately the same throughout.

15 represents an endless conveyer, which comprises parallel chains passing over idle pulley 16, throughout the framework. These pulleys 16 have roller bearing mounting on short inwardly projecting stubs 17 secured to standards 2, and a pair of sprocket wheels over which the chains pass, are secured upon a shaft 18 extending outside the framework and having a worm wheel 19 secured thereon. This worm wheel 19 is driven by a worm 20 on a drive shaft 21 driven by a pulley 22 from any source of power, and the particular operation and movement of the conveyer 15 will be more fully hereinafter set forth in the description of the operation of the apparatus.

The inlet end of the framework is provided at its base with a trackway for wheeled cradles 23 supporting open tanks 24 and 25 respectively, the former containing cleansing fluid, such as turpentine, benzin, and the like, and the latter containing japanning liquid, which is pumped to the tank and any overflow will escape through a spout 26 into a pipe 27 emptying into a trap 28. The pair of chains, constituting the conveyer 15, are provided at regular intervals with inwardly projecting alined spring-pressed plungers 29, having heads on their outer ends and beveled at their inner ends. These plungers 29 are adapted to engage in the ends of tubular article supports 30 to carry them through the apparatus and these supports 30 are provided with a series of wire hooks 31 to support the articles and keep them separated. The plungers are automatically operated to take hold of the article supports at the inlet end of the apparatus and discharge them at the outlet end of the apparatus, as will now be explained.

At the inlet end of the apparatus, inside the chains, and in the path thereof, cam plates 32 are located and are notched at their upper ends to support the tubular holders 30. The latter, when filled, are placed in position on the cam plates, and as the plungers pass the plates 32, they will be forced outward by the cam action against the plates and will spring into the ends of the tubes 30 lying on the plates 32 and carry the articles forward through the apparatus.

At the discharge end of the apparatus, cam plates 33 are located outside the chains but in the path of the headed ends of plungers 29. These cam plates are made with slots 34 to receive the plungers and exert an outward pull on the plunger heads, causing the plungers to release the article holders and drop them onto a suitable conveyer 36 to carry them away, and the inner ends of these slots 24 are enlarged sufficiently to enable the plunger heads to move therethrough and the plungers to assume their normal positions after releasing the article holders without stopping the chains.

A long inclined drip pan 35 is located below and approximately parallel with the conveyer 15 and extends from the top of japanning tank 25 to the wall of the oven, and due to its proximity to the oven, it is maintained at the proper temperature to direct the drip back into the tank 25 preventing undue loss of material.

The operation of my improvements is as follows:—
The operator places a tubular article holder 30, containing a series of articles to be japanned, on its supporting hooks 31, in the notches of cam plates 32. As the spring-pressed plungers 29 contact with the cam plates 32, they will be forced back and held back until the plungers reach the notches in plates 32, when they will spring into the ends of tubular article holder 30 and carry the latter along with the conveyer. As one article holder is taken up by the conveyer, the operator places another holder in position so that each pair of spring-pressed plungers will pick up an article holder as they pass the cam plates, when the apparatus is running at full capacity. Conveyer 15 carries the articles up over one pair of pulleys 16, thence down below another pair and through the cleansing liquid in tank 24, thence up over another pair of pulleys 16, and down below another pair of pulleys, where the articles are thoroughly immersed in the japanning liquid in tank 25. The articles are then carried upward in an inclined rearward direction over the drip pan 35, which latter catches the drip from the articles and directs it back into tank 25. The articles are then carried by the conveyer 15, down, around, and between the partitions 10 and 11, constituting the heat retaining trap at the inlet end of the oven, and thence up and down in a long circuitous path throughout the oven, the purpose of this long path being to permit the articles to be retained in the oven a sufficient length of time to thoroughly dry the japanned articles, when they pass out between the partitions 10 and 11, at the outlet end of the oven. At this end of the oven, the headed ends of spring-pressed plungers 29 move into the slots 34 of cam plates 33 to withdraw the plungers 29 from holders 30, and drop the latter and the articles thereon, onto the conveyer 36, to be carried away to any desired point of delivery. The slots 34, in cam plates 33, being enlarged at their inner ends, as above explained, permit the headed ends of plungers 29 to escape, after releasing the article holders, and without stopping the movement of the conveyer.

A great many slight changes might be made in the general form and arrangement of the parts described without departing from my invention, and hence, I would have it understood that I do not restrict myself and am at liberty to make such slight changes and alterations as fairly fall within the spirit and scope of my invention.

Having fully described my invention, what I claim as new and desire to secure by Letters-Patent is:—

1. In an automatic japanning apparatus, the combination of a framework comprising vertical standards with interposed vertical hollow slides forming dead air spaces, cross bars at the top of the standards, and interposed horizontal hollow slides between the cross bars.

2. In an automatic japanning apparatus, the combination of a framework comprising a series of units, tie bars joining the units, and devices on the units securing them movably to a support to permit the framework to expand and contract.

3. In an automatic japanning apparatus, the combination of a framework comprising a series of units joined together, each unit consisting of two pair of standards, cross bars connecting their upper ends, hollow slides between the standards and cross bars and between the units, rails having grooved sides, plates secured to opposite sides of the standards, and lugs on the plates projecting into the grooves in the rails locking the standards to the rails but permitting sliding movement thereon to compensate for expansion and contraction of the framework.

4. In an automatic japanning apparatus, the combination with an oven, of heating pipes in the bottom of the oven, fuel burners directing a flame into said pipes, one burner at one end of the oven and another burner at the other end thereof, and means for conveying japanned articles from end to end of the oven.

5. In an automatic japanning apparatus, the combination with an oven, of parallel horizontal pipes in the bottom of the oven extending from end to end thereof, a liquid fuel burner directing its flame into one pipe at one end of the oven, a second fluid burner directing its flame into the other pipe at the other end of the oven, and means for conveying japanned articles through the oven.

6. In an automatic japanning apparatus, the combination with an oven, of downwardly and upwardly projecting partitions at each end of the oven forming heat retaining traps, a conveyer passing through said traps, means for supporting japanned articles on said conveyer, and idlers in the oven compelling the conveyer and articles to take a long path through the oven to thoroughly dry the articles.

7. In an automatic japanning apparatus, the combination with an oven, of parallel endless chains constituting a conveyer and movable through the oven, a tank for cleansing liquid and a tank for japanning liquid, both of said tanks arranged near the entrance of the furnace and means for supporting articles on the conveyer to compel the latter to move them through both liquids and through the oven.

8. In an automatic japanning apparatus, the combination with a framework, a portion of which constitutes an oven, a trackway in said framework, near the entrance end of the furnace, two wheeled cradles on said trackway, tanks on said cradles, both in front of the entrance to the furnace one tank containing a cleansing liquid and the other japanning liquid, and a conveyer constructed to carry articles through the liquids in both tanks and through the oven.

9. In an automatic japanning apparatus, the combination with an oven, of a tank for cleansing liquid and a tank for japanning liquid both in advance of the entrance to the oven, an endless conveyer passing over the tanks and through the oven, holders removably attached to the conveyer, article supporting hooks on the holder to immerse the articles in the liquids in both tanks as they pass, and carry them through the oven separated from each other.

10. In an automatic japanning apparatus, the combination with an oven, and tanks containing cleansing and japanning liquid respectively, of a conveyer to move the articles through the liquids in the tanks and through the oven, and comprising parallel endless chains, spring-pressed alined plungers carried by the chains, tubular article holders to be engaged and supported by the plungers, and means in the path of the plungers to withdraw them and guide them into engagement with the article holders, and means for releasing the plungers from the article holders after the latter have passed through the oven.

11. In an automatic japanning apparatus, the combination with an oven, and tanks of cleansing and japanning liquids, of a conveyer comprising parallel endless chains and so located as to immerse articles carried thereby in the liquids of both tanks and convey them through the oven, inwardly projecting spring-pressed alined plungers on the chains, notched cam plates in the path of the plungers, tubular article holders to be supported by the notched cam plates and in position to receive the plungers when the latter reach the notches in said plates after being forced outward by the plates, and means for releasing the plungers from the article holders after the latter have passed through the oven.

12. In an automatic japanning apparatus, the combination with an oven, and tanks of cleansing and japanning liquids, of a conveyer comprising parallel endless chains and so located as to immerse articles carried thereby in both liquids and convey them through the oven, inwardly projecting spring-pressed alined plungers carried by the chains and having heads at their outer ends, tubular article holders supported by the plungers, slotted cam plates at the rear of the oven and in the path of the plungers to receive the latter and exert outward pressure on the heads to release the article holders, and the inner ends of the slots enlarged to release the plungers after the article holders are dropped.

13. In an automatic japanning apparatus, the combination with an oven, and two tanks containing respectively cleansing and japanning liquid both tanks disposed in front of the entrance end of the furnace, of a conveyer constructed to dip articles carried thereby successively into material in said tanks and then convey them through the oven, a long inclined drip pan located between the oven and japanning tank below an inclined portion of the conveyer and constructed to direct japanning liquid dripped thereon, back into the japanning tank, and said drip pan maintained warm by reason of its proximity to the oven.

14. In an automatic japanning apparatus, the combination with an oven, of a trackway in front of the entrance to the oven, wheeled cradles movable on the trackway, tanks carried by the cradles and containing respectively cleansing and japanning liquids, and a conveyer constructed to dip articles thereon successively into the liquids contained in said tanks and then convey them through the oven.

15. In an automatic japanning apparatus, the combination with parallel fixed rails forming a track, of a sectional metallic framework keyed to slide on the track to compensate for expansion and contraction of the framework, and mechanism closing a part of said framework forming an oven.

In testimony whereof, I have signed this specification in the presence of two subscribing witnesses.

DAVID FELIX BRODERICK.

Witnesses:
R. S. FERGUSON,
GEO. F. DOWNING.